United States Patent
Zachau et al.

(10) Patent No.: US 6,380,669 B1
(45) Date of Patent: Apr. 30, 2002

(54) SIGNALING LAMP WITH PHOSPHOR EXCITATION IN THE VUV RANGE AND HAVING SPECIFIED PHOSPHOR MIXTURES

(75) Inventors: Martin Zachau, Geltendorf; Ulrich Mueller, Munich, both of (DE)

(73) Assignee: Patent-Treuhand-Gesellschaft fuer elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/367,228

(22) PCT Filed: Dec. 11, 1998

(86) PCT No.: PCT/EP98/08107

§ 371 Date: Aug. 11, 1999

§ 102(e) Date: Aug. 11, 1999

(87) PCT Pub. No.: WO99/33403

PCT Pub. Date: Jul. 8, 1999

(30) Foreign Application Priority Data

Dec. 23, 1997 (EP) .............................. 97122800

(51) Int. Cl.$^7$ .............. H01J 1/62; H01J 63/04; C09K 11/08; C09K 11/54

(52) U.S. Cl. .............. 313/487; 313/483; 313/485; 313/486; 313/635; 252/301.4 R; 252/301.6 R

(58) Field of Search .............. 313/491–93, 483–487, 313/496, 634–35; 252/301.4 R, 301.6 R, 519.51, 519.52, 519.54, 519.1, 519.13, 519.15, 519.5; 423/277

(56) References Cited

U.S. PATENT DOCUMENTS 4,085,351 A 4/1978 Takahashi et al.

5,776,368 A * 7/1998 Chau .................. 252/301.4 R

FOREIGN PATENT DOCUMENTS

| DE | 4311197 | 10/1994 |
|---|---|---|
| DE | 19526211 | 1/1997 |
| DE | 19636965 | 3/1998 |
| EP | 0331738 | 9/1989 |
| EP | 0393754 | 10/1990 |
| EP | 0286180 | 10/1998 |
| EP | 0926704 | 6/1999 |
| WO | 9726312 | 7/1997 |

OTHER PUBLICATIONS

Patent Abstracts of Japan, vol. 097, No. 003, Mar. 31, 1997 & JP 08 306341 A (Matsushita Electric Works Ltd), Nov. 22, 1996.

Patent Abstracts of Japan, vol. 002, No. 034 (C–005), Mar. 8, 1978 & JP 52 133029 A (Dainippon Toryo Co Ltd: Others: 01) Nov. 8, 1977.

Database WPI, Section Ch, Week 8019, Derwent Publications Ltd., London, GB; Class L03, AN 80–33656C, XP002064946 & JP 55 043101A (Kasei Optonix Ltd) Mar. 26, 1980.

* cited by examiner

Primary Examiner—Vip Patel
Assistant Examiner—Mack Haynes
(74) Attorney, Agent, or Firm—William E. Meyer

(57) ABSTRACT

The invention relates to a signaling lamp with VUV phosphor excitation, in particular for traffic applications. It further relates to the use of phosphor mixtures for red, green and yellow signaling lamps and to a correspondingly constructed traffic light. (FIG. 1).

12 Claims, 2 Drawing Sheets

SIGNALING LAMP WITH PHOSPHOR EXCITATION IN THE VUV RANGE AND HAVING SPECIFIED PHOSPHOR MIXTURES

CROSS REFERENCES

Reference is made to the following parallel applications from the same applicant, with the application date Dec. 23, 1997: European patent application Ser. No. 97122798.8 with the title "Flat signaling lamp with dielectric barrier discharge" and U.S. patent application Ser. No. 08/996,926 with the title "Barium magnesium aluminate phosphor".

TECHNICAL FIELD

The present invention relates to signaling lamps, in particular in the area of traffic signals and traffic signs. From a particular point of view, it relates to signaling lamps for traffic lights.

In general, lamp technology is not only applied in illumination tasks. The area of signaling lamps is also an important field in lamp technology. The term signaling lamp should in this case be understood primarily to be a lamp which provides information to the observer (informs) about an event or a state. This information is generally already imparted to the observer by the on or off state of the lamp. Furthermore, the lamp may impart additional information content to the observer, for example by means of its shape, color or a legend.

Signaling lamps are used in very many areas of daily life, for example in road traffic, in marine transport and in railroads. Furthermore, they play a role in virtually all forms of technical equipment to be operated or monitored by an operator, be it in the area of household appliances or in entertainment electronics. Furthermore, safety signs for buildings or traffic, commercial or industrial installations should be mentioned, for example airports, train stations, cinemas, public buildings and the like. For example, signaling lamps are being used more and more for indicating escape routes, for drawing attention to hazards, and for drawing attention to particular situations for example, a fire alarm and the like.

PRIOR ART

Typical of the area of signaling lamps are particular requirements on reliability, which are based on the one hand on safety viewpoints and, on the other hand, are necessitated by their widespread uses in terms of numbers and location and the associated considerable effort for servicing and maintenance. Furthermore, in many applications it is necessary or desirable to be able to use particular physical shapes, for example particularly flat signaling lamps.

Conventionally, normal incandescent lamps or incandescent halogen lamps are generally used in signaling lamps. This applies in particular to the numerous signaling lamps which have to be switched on and off during operation.

Incandescent lamps, including incandescent halogen lamps, have significant disadvantages, however: as a result of the use of a more or less fine incandescent filament, they are basically relatively sensitive to vibration, which leads to restrictions in their use, in particular in the traffic sector.

Furthermore, their operating service life is restricted to a few thousand hours, depending on the lamp type and the operating voltage used. However, an early end to this operating service life is very disadvantageous, in exactly the same way as any other type of susceptibility to defects, because of the frequently high numbers and very widespread uses of signaling lamps, as mentioned.

In many applications, the incandescent lamps have to be installed in an optical system, for example one having a reflector and/or with lenses. Such systems are sensitive to misadjustment of a lamp base or other elements. Furthermore, a certain amount of internal soiling, above all in the traffic sector, is basically unavoidable, so that it is generally not possible, even following expensive internal cleaning operations, to reproduce the initial output of the lamp.

Above all in the case of incandescent lamp applications which have an optical system with reflectors or lenses, for example for illuminating a relatively large signaling area or for controlling the radiation direction of the signaling lamps, a relatively cumbersome overall size and shape or a corresponding weight is inevitable, but in many cases is very undesirable.

In addition, LEDs, that is to say light-emitting diodes, are known in the signaling lamp sector. However, they have the disadvantage that the color locus, which is important for signaling lamp applications and often standardized, cannot be adjusted. Occasionally, they are also unsuitable because of the radiation characteristic.

DESCRIPTION OF THE INVENTION

This invention is therefore based on the technical problem of specifying a new signaling lamp having new possibilities for avoiding the abovementioned difficulties. Furthermore, the invention relates to preferred means for producing a signaling lamp according to the invention, to be specific the use of specific phosphors or phosphor mixtures as described below.

According to the invention, provision is made for a signaling lamp as claimed in claim 1 and its uses as claimed in claims 14, 15 and 16. In addition, in claims 3, 4, 10 and 12, the invention specifies phosphors or phosphor mixtures for use in a green, a yellow or a red signaling lamp.

According to the invention, therefore, a fluorescent lamp is provided, in specific terms a fluorescent lamp having a particularly short-wavelength excitation in the VUV range (Vacuum Ultra Violet range), that is to say that a wavelength below 200 nm. Particularly preferred in this case are excitation wavelengths below 185 nm or below 180 nm. Fluorescent lamps have significant advantages over incandescent lamps with regard to their operational service life, reliability and also with regard to the achievable physical shapes and sizes. VUV fluorescent lamps are a technically relatively novel and particularly interesting sector.

This relates primarily to dielectric barrier discharges, above all of noble gases, and primarily also to the dielectric barrier Xe excimer lamp. In relation to the constructional and electrical details of dielectric barrier gas discharge lamps, reference is made to the applications DE-P 43 11 197.1 (WO 94/23442), DE 195 26 211.5 (WO 97/04625), DE 196 36 965.7 and, with regard to the specific applications of a traffic light, primarily to the European parallel application "Flat signaling lamp with dielectric barrier discharge" (97122798:8), the respective disclosure content of the abovementioned applications being included by reference in this application. This applies above all to the pulse technique in electrical operation, the electrode configuration for particularly uniformly illuminated lamps and special, primarily flat, overall shapes as well as, as mentioned, the construction of a traffic light from dielectric barrier gas discharge lamps.

In the signaling lamp sector, the colors red, green and yellow have a particular significance, for example in traffic lights, motor-vehicle signaling lamps (yellow and red), marine lamps (green and red for starboard and port) and so on. The invention therefore relates in particular to phosphors and phosphor mixtures with which appropriate signaling lamps can be implemented with VUV excitation. In many cases, standards also have to be complied with, for example in motor-vehicle rear lamps or traffic lights.

To begin with green signaling lamps, according to the invention, the phosphors listed in the claims: $BaMgAl_{10}O_{17}:Mn$, $Zn_2SiO_4:Mn$, $Sr_4Al_{14}O_{25}:Eu$, $BaMgAl_{10}O_{17}:Eu$, $BaCaAl_{28}O_{45}:Eu$, $LaPO_4:Ce,Tb$ and $Y_3Al_5O_{12}:Ce$ have been shown to be phosphors which can be used in the VUV excitation range and from which a signal green may be produced by an appropriate mixture. In particular, green signaling lamps can be produced in a particularly simple and thus advantageous way in many applications merely by using the phosphor $Sr_4Al_{14}O_{25}:Eu$. This is because, according to the invention, it has been shown that the corresponding color locus with VUV excitation—see the exemplary embodiment—is located particularly favorably.

Furthermore, it has been shown that signal green tones may be mixed in a flexible manner by using a mixture of $BaMgAl_{10}O_{17}:Mn$ and/or $Zn_2SiO_4:Mn$ on the one hand, and $Sr_4Al_{14}O_{25}:Eu$ and/or $BaMgAl_{10}O_{17}:Eu$ and/or $BaCaAl_{28}O_{45}:Eu$ on the other hand, it being possible to meet appropriate standards, for example for traffic-light green (as shown in the exemplary embodiment for the case of the German DIN Standard).

Additional freedom is obtained by adding a third component of $LaPO_4:Ce,Tb$ and/or $Y_3Al_5O_{12}:Ce$, which are located at considerably higher x values in the xy color plane. By contrast, the range of lower x values may be obtained by means of the first two abovementioned mixture components of $BaMgAl_{10}O_{17}:Mn$ and $Zn_2SiO_4:Mn$ at higher y values, and $Sr_4Al_{14}O_{25}:Eu$ and, in particular, $BaMgAl_{10}O_{17}:Eu$ and/or $BaCaAl_{28}O_{45}:Eu$ at lower y-values. From among the pairs of phosphors mentioned and/or linked, the following are preferably selected in the sense of the invention:

It has been shown that the phosphor $BaMgAl_{10}O_{17}:Eu$ exhibits relatively poor maintenance, that is to say the maintenance of the yield and of the color locus, over the operating time under VUV irradiation, for which reason $Sr_4Al_{14}O_{25}:Eu$ is preferred over it. In addition, $Sr_4Al_{14}O_{25}:Eu$ exhibits the position in the xy color chart which is closer to the spectral green point at 550 nm on the spectral curve, which is optimum in terms of the visual effect (that is to say the sensitivity of the human eye).

On the other hand, the maintenance properties of the phosphor $BaMgAl_{10}O_{17}:Eu$ may be improved considerably by means of a hyperstoichiometric proportion of Mg, as described in detail and claimed in the U.S. parallel application "Barium magnesium aluminate phosphor" (08/996,926). The disclosure content of this U.S. parallel application is hereby included as well by reference. Overall, however, $Sr_4Al_{14}O_{25}:Eu$ is also to be preferred over the $BaMgAl_{10}O_{17}:Eu$ phosphor with a hyperstoichiometric proportion of Mg, above all with regard to the maintenance properties.

In the pairing of $BaMgAl_{10}O_{17}:Mn$ and $Zn_2SiO_4:Mn$, firstly the color of $Zn_2SiO_4:Mn$ lies closer to the 550 nm point on the spectral curve and therefore initially appears to be the obvious choice. On the other hand, it has been shown, according to the invention, that the production of $Zn_2SiO_4:Mn$ is very problematic and, in particular under VUV irradiation, tends to instability, and in addition $BaMgAl_{10}O_{17}:Mn$, above all under the excitation preferred by the invention, shows a better quantum yield as a result of an Xe excimer discharge.

In the case of the remaining pair $LaPO_4:Ce,Tb$ and $Y_3Al_5O_{12}:Ce$, it has been shown that $LaPO_4:Ce,Tb$ exhibits a considerably better yield under VUV excitation than $Y_3Al_5O_{12}:Ce$ and is therefore to be preferred.

In principle, however, it is also possible to manage with only two phosphors in the green area, which, in the case of the combination of $BaMgAl_{10}O_{17}:Mn$ and $BaMgAl_{10}O_{17}:Eu$, is reduced to dual activation of the same host lattice, that is to say the phosphor $BaMgAl_{10}O_{17}:Mn,Eu$. The correct green color can then be set by the relative concentration of the activation elements Eu and Mn.

In the case of yellow signal colors, it is necessary to work relatively close to the spectral curve, where the relevant Standards are located. For this purpose, according to the invention, a mixture of $(Y,Gd)BO_3:Eu$ on the one hand and $Zn_2SiO_4:Mn$ and/or $LaPO_4:Ce,Tb$ on the other hand is provided. In this case, $LaPO_4:Ce,Tb$ has a better yield than $Zn_2SiO_4:Mn$ under VUV excitation, for which reason the combination $(Y,Gd)BO_3:Eu$ and $LaPO_4:Ce,Tb$ is preferred. As a result, the area of interest in the vicinity of the spectral curve can be reached, but it must not be overlooked that $Zn_2SiO_4:Mn$ has an advantage over $LaPO_4:Ce,Tb$ as a result of its closer position to the spectral curve. If, therefore, a color locus particularly close to the spectral curve is desired, it is not possible to dispense with $Zn_2SiO_4:Mn$.

Particular difficulties have arisen in the case of signal red. The phosphor $(Y,Gd)BO_3:Eu$, with an orange-colored main emission has a color which is located at too short a wavelength. Other red phosphors, such as $Y_2O_2S:Eu$ or $YVO_4:Eu$ are, from this point of view, located very much more favorably in the color diagram.

On the other hand, it has been shown, according to the invention, that considerable yield problems actually occur in the case of signal red, and $(Y,Gd)BO_3:Eu$ has the best yield by far among the red phosphors in the VUV range, specifically considerably more so in real lamps than in the powder sample. According to the invention, therefore, the not quite optimal location of $(Y,Gd)BO_3:Eu$ is tolerated in order to achieve a yield which is sufficient for the practical application. Depending on the red Standard to be achieved, an additional red filter is then used. This is because it has been shown that, in spite of the filter losses, the combination of $(Y,Gd)BO_3:Eu$ and additional color filtering is ultimately more efficient than the use of a different red phosphor having a poorer yield. In this case, the filter should be as sharp-edged as possible and, for example with regard to the German Standard for traffic-lights red, should have a cut-off at about 595 nm.

Preferred fields of application of a signaling lamp according to the invention are luminous traffic signs or traffic signals, specifically both in road traffic and in rail or marine traffic. In this context, the invention primarily relates to a traffic light, in particular to the phosphor mixtures explained above for the colors green, yellow and red. However, a further, important field of application is also in motor-vehicle lamps, for example red rear lights, brake lights or yellow turn (up) indicators.

The short formulae used above for the various phosphors should be understood as follows for this application, the narrower lower limits and (irrespective of the lower) the narrower upper limits being understood to be correspondingly preferred in each case:

TABLE 1

1. $BaMgAl_{10}O_{17}:Eu = Ba_{1-e}Eu_3Mg_{1+\delta}Al_{10+2f}O_{17+\delta+3f}$
2. $BaMgAl_{10}O_{17}:Mn = Ba_{1-m}Mn_mMg_{1+\delta}Al_{10+2f}O_{17+\delta+3f}$
3. $BaMgAl_{10}O_{17}:Eu,Mn = Ba_{1-e-m}Eu_eMn_mMg_{1+\delta}Al_{10+2f}O_{17+\delta+3f}$ in each case with:

0; 0.05; 0.1; $0.15 \leq e \leq 0.2$; 0.25; 0.3; 0.4; (< applies in the case of 0)
0; 0.05; 0.1; $0.15; \leq m \leq 0.2$; 0.25; 0.3; (< applies in the case of 0)
0.01; 0.015; 0.02; 0.025; $0.03 \leq \delta \leq 0.04$; 0.05; 0.06; 0.07; 0.08; 0.09; 0.10;
0; 0.1; $0.2 \leq f \leq 0.3$; 0.4; 0.5; 0.7; 1;

4. $BaCaAl_{28}O_{45}:Eu = BaCa_xEu_yAl_{28+2f}O_{45+3f}$ with:

0.05; 0.1; $0.2 \leq x \leq 0.4$; 0.6; 0.9;
0.05; 0.1; $0.2 \leq y \leq 0.4$; 0.6; 0.9;
0; 0.1; $0.2 \leq f \leq 0.3$; 0.4; 0.5; 0.7; 1;

5. $LaPO_4:Ce,Tb = La_{1-a-b}Ce_aTb_bP_{1+2f}O_{4+5f}$ with:

0; 0.1; $0.15 \leq a \leq 0.3$; 0.4; 0.6;
$0.05 \leq b \leq 0.2$; 0.3; 0.5;
$0 \leq f \leq 0.1$;

6. $Zn_2SiO_4:Mn = Zn_{2-a-b}Mg_aMn_bSi_{1+f}O_{4+2f}$ with:

$0 \leq a \leq 0.05$; 0.1; 0.2;
0.02; $0.05 \leq b \leq 0.15$; 0.2; 0.3;
$0 \leq f \leq 0.2$;

7. $Y_3Al_5O_{12}:Ce = Y_{3-a}Ce_aAl_{5+2f}O_{12+3f}$ with:

0.01; $0.05 \leq a \leq 0.15$; 0.3; 0.5;
$0 \leq f \leq 0.5$;

8. $Sr_4Al_{14}O_{25}:Eu = Sr_{4-a}Eu_aAl_{14+2f}O_{25+3f}$ with:

0.01; $0.05 \leq a \leq 0.15$; 0.3;
$0 \leq f \leq 1$

9. $(Y,Gd)BO_3:Eu = Y_{1-a-b}Gd_aEu_bB_{1+2f}O_{3+3f}$ with:

$0 \leq a \leq 0.25$; 0.5; 0.99;
0.01; 0.03; $0.05 \leq b \leq 0.15$; 0.2; 0.3;
$a + b \leq 1$;
$0 \leq f \leq 0.2$.

In addition to the ideal compositions described, compositions are also included which fall outside the abovementioned concentration ranges but are adjacent thereto and have the same phase.

DESCRIPTION OF THE DRAWINGS

Some exemplary embodiments of the invention are explained below with reference to the figures, in which.

For the mixture of phosphors according to the invention, in order to meet specific signaling color standards by means of the phosphor mixture, it is firstly necessary to measure the color loci of the phosphors of interest under VUV excitation. Without this being understood as restrictive, the following measured values of typical examples from the composition ranges previously specified are based on the description of the exemplary embodiments:

TABLE 1

| | | |
|---|---|---|
| 1. $BaMgAl_{10}O_{17}:Eu$: | x = 0.155; | y = 0.058; |
| 2. $BaMgAl_{10}O_{17}:Mn$: | x = 0.141; | y = 0.741; |
| 3. $LaPO_4:Ce,Tb$: | x = 0.338; | y = 0.577; |
| 4. $Zn_2SiO_4:Mn$: | x = 0.228; | y = 0.694; |
| 5. $Y_3Al_5O_{12}:Ce$: | x = 0.391; | y = 0.483; |

TABLE 1-continued

| | | |
|---|---|---|
| 6. $Sr_4Al_{14}O_{25}:Eu$: | x = 0.141; | y = 0.368; |
| 7. $(Y,Gd)BO_3:Eu$: | x = 0.640; | y = 0.359. |

The color loci of the individual phosphors on which the invention is based were not known and do not correspond to the generally documented data relating to Hg discharge excitation.

Figure 1:
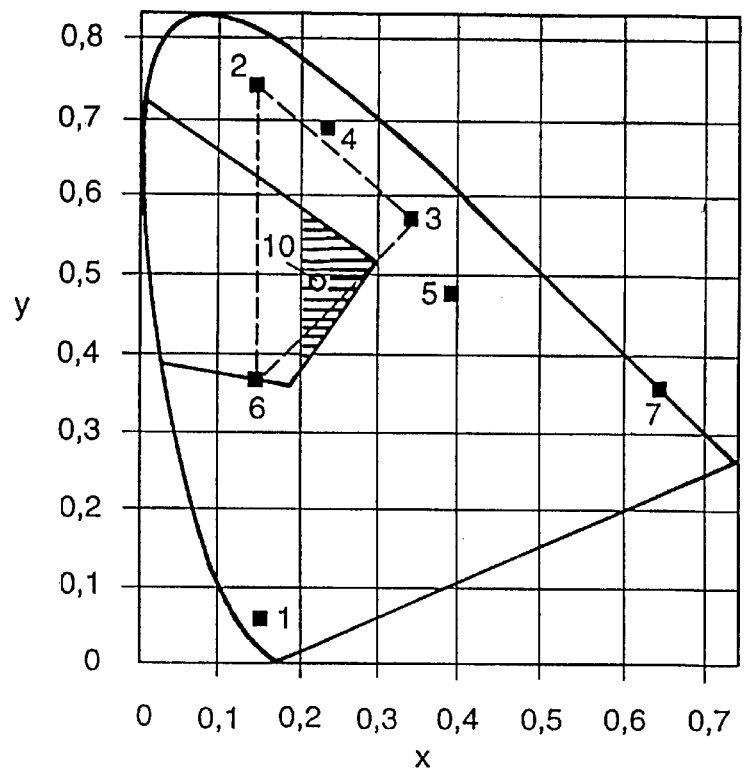
FIG. 1 shows an xy Standard color diagram having color loci of the phosphors of interest here, and a Standard range for traffic-light green, shown as an example.

FIG. 1 illustrates an xy Standard color plane as a graph. It is possible to see the curved spectral color curve and, in the enclosed area, the color loci corresponding to the phosphors specified in the two tables. In this case, the reference numbers in the numbering correspond to the above Table 2. For example, between x=0 and x=0.3 and y=0.35 and y=0.7, it is possible to see an area of green colors (including the hatched triangle at the right-hand edge), which represents the German Standard for traffic-light green (DIN 6163,5) which is used here for the preferred exemplary embodiment.

It can be seen that the phosphor $Sr_4Al_{14}O_{25}:Eu$, which is designated by the reference number 6, is located at the limit of the DIN Standard. It can therefore also be used within the scope of the DIN Standard as an individual phosphor without a second component, but only under very well controlled production conditions, since it can easily leave the standardized area in the event of the fluctuations which generally occur.

All the further VUV-excitable phosphors considered here are located outside the Standard area. However, it can be seen that two-component mixtures lead into the Standard area. In this case, $BaMgAl_{10}O_{17}:Eu$ with a hyperstoichiometric proportion of Mg is preferred, because of its better VUV stability. Furthermore, a particularly advantageous choice is also the dual activation of $BaMgAl_{10}O_{17}$ with Eu and Mn (as a single-component system), which corresponds to the connecting line between the two points designated by the reference numbers 1 and 2.

A further advantageous combination is the two-fold combination of $Sr_4Al_{14}O_{25}:Eu$, reference number 6, and $BaMgAl_{10}O_{17}:Mn$, reference number 2.

According to the invention, however, that region of the Standard green area which is marked as a hatched triangle has been shown to be the region having the best visual usable effect. This does not simply result from the above-mentioned criterion relating to the distance from the 550 nm point on the spectral curve, which applies only to individual emissions. However, during repeated computer simulations, the hatched region has also been shown to be beneficial with regard to the visual useble effect of the phosphor mixtures. This region may best be provided using a three-way combination according to the invention of $Sr_4Al_{14}O_{25}:Eu$ (6), $BaMgAl_{10}O_{17}:Mn$ (2) and $LaPO_4:Ce,Tb$ (3). It is necessary, in particular, to take account of the fact that a dual combination of $Sr_4Al_{14}O_{25}:Eu$ (6) and $LaPO_4:Ce,Tb$ (3), above all in the case of color loci located at the preferred right-hand point of the hatched triangle, is located too close to the limit of the DIN Standard, which points toward the bottom right in the graph.

The exemplary embodiment for signal green of a traffic light which meets the DIN Standard therefore relates, as a percentage by weight, to the mixture of 50% $Sr_4Al_{14}O_{25}:Eu$, 45% $LaPO_4:Ce, Tb$ and 5% $BaMgAl_{10}O_{17}:Mn$. This results in the color locus designated by the reference number 10 (x=0.294, y=0.520).

The mixing process, illustrated here using the example of the German DIN Standard, of a green phosphor mixture which meets the Standard also has to be carried out in a similar way for other standards for signal green.

The phosphor (Y,Gd)BO$_3$:Eu is also shown in the vicinity of the spectral color curve in FIG. 1 at relatively high x values, using the reference number 7. Its position is clearer in FIG. 2, in which, in addition, some standards for signal yellow and signal red are illustrated.

Figure 2:
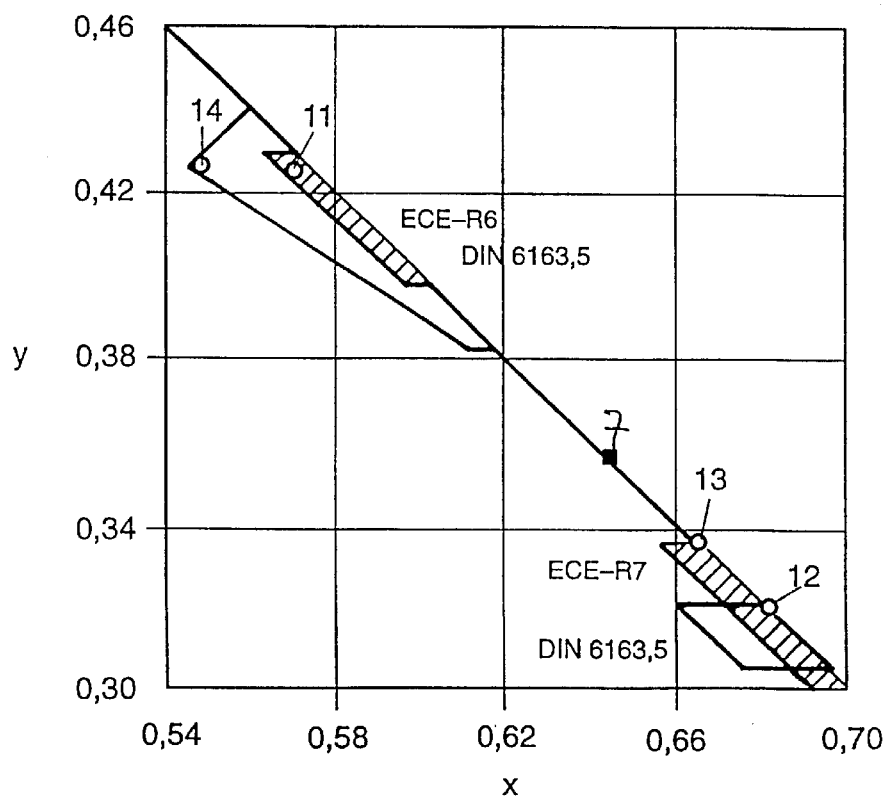
FIG. 2 shows a detail from FIG. 1 in an enlarged illustration with further examples for red and green Standard signaling colors.

Firstly, the larger, unhatched region in the left top part of FIG. 2 represents the Standard for the signal yellow of a traffic light to DIN 6163,5. According to the invention, this signal yellow is realized by a phosphor mixture of (Y,Gd)BO$_3$:Eu, reference number 7, Zn$_2$SiO$_4$:Mn, reference number 4, and LaPO$_4$:Ce,Tb, reference number 3. In the present case, the phosphor Zn$_2$SiO$_4$:Mn (4) is used to shift the color locus of the (Y,Gd)BO$_3$:Eu—LaPO$_4$:Ce,Tb mixture (7, 3) closer to the spectral color curve, since Zn$_2$SiO$_4$:Mn (4) is located somewhat closer to the spectral color curve, as FIG. 1 shows. However, as little Zn$_2$SiO$_4$:Mn as possible is added. In this exemplary embodiment, a composition of 58% (Y,Gd)BO$_3$:Eu and 42% LaPO$_4$:Ce,Tb and no Zn$_2$SiO$_4$:Mn is used (in each case as a percentage by weight). The color locus of this example bears the reference number 14.

Depending on the precise course of the Standard to be met, and depending on the production tolerances or color-locus fluctuations in production which have to be taken into account, it is possible, and also preferred, to operate with a two-component mixture consisting only of (Y,Gd)BO$_3$:Eu and LaPO$_4$:Ce,Tb. The second hatched Standard area within the DIN Standard area just mentioned relates to the European Standard ECE-R6 for yellow motor-vehicle lamps, that is to say direction indicators. This Standard can be met by the yellow phosphor mixture described, in conjunction with an additional filter, which blocks wavelengths below about 500 nm (to be specific, a heat-shrink tube, color 93046, from Rehau AG and Co., 95104 Rehau). This results in the color locus designated by 11.

Finally, the right lower corners in FIG. 2 shows two standards for signal red. The unhatched area with the color locus designated by 12 in the right top corner corresponds to DIN 6163.5 for traffic-light red. A VUV fluorescent lamp with a color locus to this Standard is realized, according to the invention, by the phosphor (Y,Gd)BO$_3$:Eu, designated by 7, in conjunction with a suitable filter.

Here, as also in the case of the motor-vehicle yellow described above, the factors which concern the filters, in addition to the optical properties, are also a certain resistance to shocks, scratches, temperatures up to about 100° C. and UV radiation. Together with a desired filter cut-off at about 595 nm, a filter which has been proven to be suitable for the case of traffic-light red in the example is a filter compound of a Plexiglas molding compound of 3 mm wall thickness (color number 33700) from Röhm GmbH in Darmstadt, a polyester color effect filter number 182 from Lee Filters of Andover, Hampshire, England, German sales through Kobold, Wolfratshausen, or else a spun bonded web scattering disc ("Niedervolt" type) from DESAG in 31073 Grünenplan. The last-mentioned filter is a conventional red traffic-light scattering disc for low-voltage applications.

In the case of the second European Standard ECE-R7 for motor-vehicle red (that is to say brake lights and rear lamps), shown hatched, somewhat less filtering is required, so that the overall yield rises. This is because the top right corner of this standardized region in FIG. 2 lies closer to the color locus of the phosphor (Y,Gd)BO$_3$:Eu (7). The color locus shown in with the reference number 13 corresponds to the use of a color effect filter number 164 from Lee Filters.

With regard to the actual engineering design of the VUV fluorescent lamp in order to use the phosphor mixtures just described, reference is made once more to the European parallel application "Flat signaling lamp with dielectric barrier discharge" (97122798.8), in which a Xe excimer lamp, in particular for a traffic light, is described. The disclosure of this application is hereby expressly included by reference. It is clear that various signaling lamp forms can be produced in an analogous way, for example motor-vehicle lamps or lights for traffic signs; depending on the application, standards and color loci other than those described above may be relevant.

Figure 3:
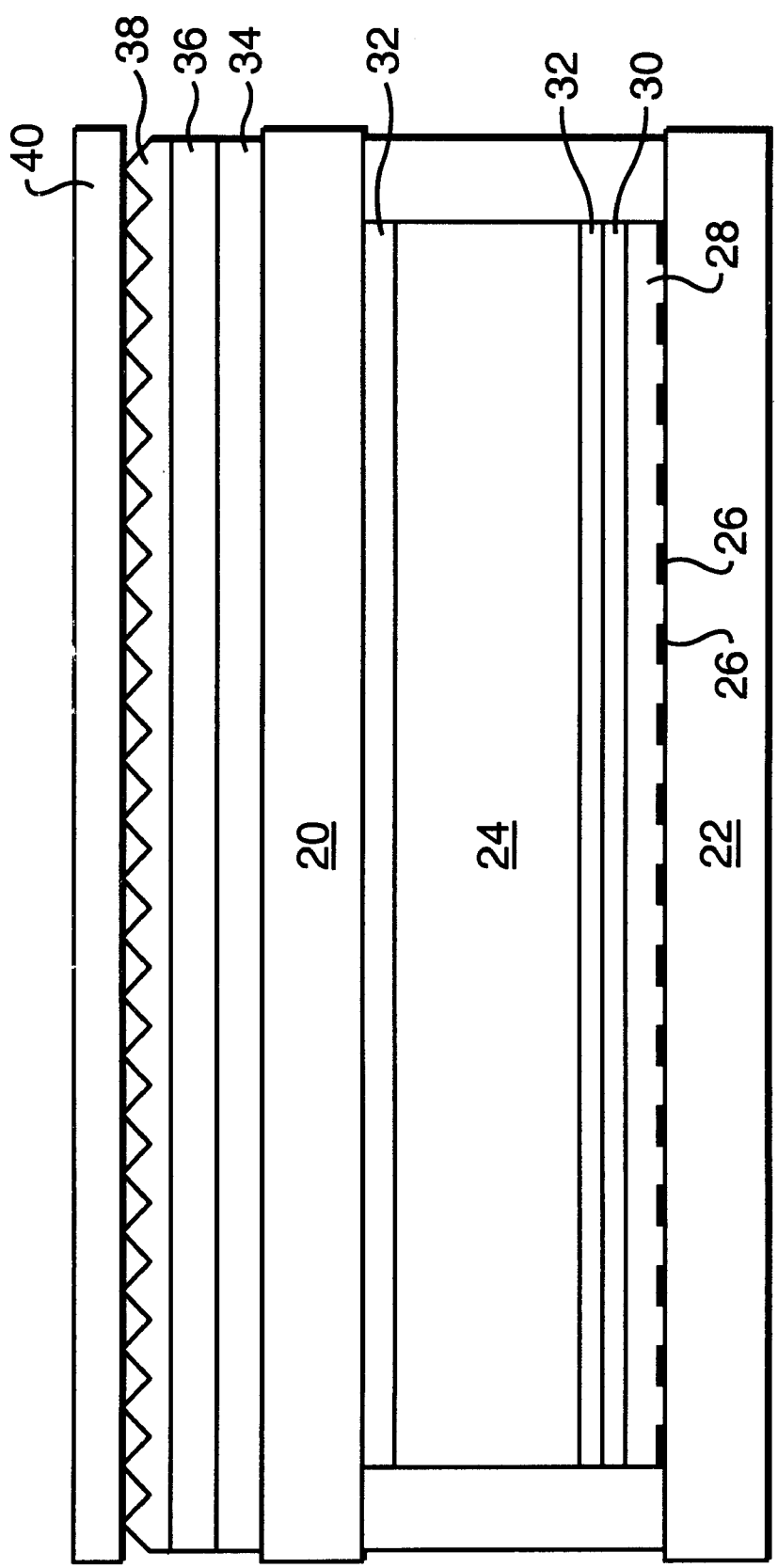
FIG. 3 shows a cross-sectional side view of a signal lamp.

FIG. 3 shows a cross-sectional side view of a signal lamp. Between glass plates 20 and 22 is a xenon fill 24. 26 is an electrode. 28 is a glass layer. 30 is a reflective layer. 32 indicates two phosphor layers. 34 is an optional filter. 36 is an optional diffuser. 38 and 40 are optional brightness enhancement layers.

What is claimed is:

1. A signaling lamp comprising: a gas discharge lamp with phosphor excitation in the VUV range at a wavelength below 200 nm, wherein the phosphor includes a mixture of at least firstly BaMgAl$_{10}$O$_{17}$:Mn and/or Zn$_2$SiO$_4$:Mn and secondly Sr$_4$Al$_{14}$O$_{25}$:Eu and/or BaMgAl$_{10}$O$_{17}$:Eu and/or BaCaAl$_{28}$O$_{45}$:Eu, for producing a green light.

2. A signaling lamp comprising: a gas discharge lamp with phosphor excitation in the VUV range at a wavelength below 200 nm, wherein the phosphor includes a phosphor mixture of at least Sr$_4$Al$_{14}$O$_{25}$:Eu and wherein the phosphor mixture additionally contains LaPO$_4$:Ce,Tb and/or Y$_3$Al$_5$C$_{12}$:Ce.

3. A signaling lamp comprising: a gas discharge lamp with phosphor excitation in the VUV range at a wavelength below 200 nm, wherein the phosphor includes a phosphor mixture of at least Sr$_4$Al$_{14}$O$_{25}$:Eu for producing a green light, and wherein the phosphor mixture contains LaPO$_4$:Ce,Tb, but no Y$_3$Al$_5$O$_{12}$:Ce.

4. A signaling lamp comprising: a gas discharge lamp with phosphor excitation in the VUV range at a wavelength below 200 nm, wherein the phosphor includes a phosphor mixture of at least Sr$_4$Al$_{14}$O$_{25}$:Eu and wherein the phosphor mixture contains BaMgAl$_{10}$O$_{17}$:Mn, but no Zn$_2$SiO$_4$:Mn.

5. A signaling lamp comprising: a gas discharge lamp with phosphor excitation in the VUV range at a wavelength below 200 nm, wherein the phosphor includes a phosphor mixture of at least Sr$_4$A$_{14}$O$_{25}$:Eu and wherein the phosphor mixture contains dual-activated BaMgAl$_{10}$O$_{17}$:Eu,Mn.

6. A signaling lamp comprising: a gas discharge lamp with phosphor excitation in the VUV range at a wavelength below 200 nm, wherein the phosphor includes a phosphor mixture of at least Sr$_4$Al$_{14}$O$_{25}$:Eu and wherein the phosphor mixture contains Sr$_4$Al$_{14}$O$_{25}$:Eu, but no BaMgAl$_{10}$O$_{17}$:Eu.

7. A signaling lamp comprising: a gas discharge lamp with phosphor excitation in the VUV range at a wavelength below 200 nm, wherein the phosphor comprises a mixture of at least firstly (Y,Gd)BO$_3$:Eu and secondly Zn$_2$SiO$_4$:Mn and/or LaPO$_4$:Ce,Tb for producing a yellow light.

8. The signaling lamp in claim 7, wherein the phosphor mixture contains LaPO$_4$:Ce,Tb, but no Zn$_2$SiO$_4$:Mn.

9. A signaling lamp comprising: a gas discharge lamp with phosphor excitation in the VUV range at a wavelength below 200 nm, wherein the gas discharge lamp is a Xenon excimer dielectric barrier gas discharge lamp, wherein the phosphor mixture includes $Sr_4Al_{14}O_{25}$:Eu for producing green light.

10. A signaling lamp comprising: a gas discharge lamp with phosphor excitation in the VUV range at a wavelength below 200 nm, wherein the gas discharge lamp is a Xenon excimer dielectric barrier gas discharge lamp, wherein the phosphor mixture includes firstly $BaMgAl_{10}O_{17}$:Mn and/or $Zn_2SiO_4$:Mn and secondly $Sr_4Al_{14}O_{25}$:Eu and/or $BaMgAl_{10}O_{17}$:Eu and/or $BaCaAl_{28}O_{45}$:Eu, for producing a green light.

11. A signaling lamp comprising: a gas discharge lamp with phosphor excitation in the VUV range at a wavelength below 200 nm, wherein the phosphor includes a, wherein the phosphor mixture additionally contains $LaPO_4$:Ce,Tb and/or $Y_3Al_5C_{12}$:Ce.

12. A signaling lamp comprising: a gas discharge lamp with phosphor excitation in the VUV range at a wavelength below 200 nm, wherein the phosphor includes a, wherein the phosphor mixture contains $LaPO_4$:Ce,Tb, but no $Y_3Al_5O_{12}$:Ce.

* * * * *